United States Patent
Adragna et al.

(10) Patent No.: US 7,192,087 B2
(45) Date of Patent: Mar. 20, 2007

(54) ADJUSTABLE SEAT CUSHION THIGH SUPPORT SYSTEM AND METHOD

(75) Inventors: Vincent Adragna, New Hudson, MI (US); Paul Wier, Washington, MI (US); Mohammad Saberan, New Baltimore, MI (US); Eric Beaulieu, Southfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/947,828

(22) Filed: Sep. 23, 2004

(65) Prior Publication Data

US 2006/0061167 A1 Mar. 23, 2006

(51) Int. Cl.
*A47C 3/00* (2006.01)

(52) U.S. Cl. .............................. 297/284.11; 297/284.9; 297/330; 297/216.1; 297/216.14; 297/216.15

(58) Field of Classification Search ............. 297/216.1, 297/216.15, 216.14, 216.13, 216.19, 284.9, 297/284.11, 330; 280/748, 752; 248/421
See application file for complete search history.

(56) References Cited

U.S. PATENT DOCUMENTS

| | | | |
|---|---|---|---|
| 2,924,265 A | | 2/1960 | Himka |
| 3,632,166 A | * | 1/1972 | Lohr ........................ 297/284.1 |
| 4,487,390 A | * | 12/1984 | Miyashita ................... 248/396 |
| 4,491,365 A | * | 1/1985 | Murakami ............. 297/284.11 |
| 4,556,185 A | * | 12/1985 | Takagi ........................ 248/421 |
| 4,615,563 A | | 10/1986 | Kobayashi |
| 4,636,002 A | | 1/1987 | Genjiro |
| 4,664,444 A | | 5/1987 | Murphy |
| 4,712,834 A | | 12/1987 | Warrick |
| 4,753,479 A | | 6/1988 | Hatsutta et al. |
| 4,767,155 A | | 8/1988 | Kousaka et al. |
| 4,775,185 A | | 10/1988 | Scholin et al. |
| 4,832,403 A | * | 5/1989 | Tomita ........................ 297/330 |

(Continued)

FOREIGN PATENT DOCUMENTS

DE 907859 B 1/1955

(Continued)

OTHER PUBLICATIONS

Combined Search and Examination Report under Sections 17 and 18(3), dated Feb. 1, 2006.

(Continued)

*Primary Examiner*—Rodney B. White
*Assistant Examiner*—Erika Garrett
(74) *Attorney, Agent, or Firm*—Brooks Kushman P.C.

(57) ABSTRACT

An adjustable seat cushion thigh support system 10 for the use of a seat and method for providing same. The seat has a cushion pan 12 that is fixed in relation to a vehicle. A pair of side rails 14 and a rear cross member 16 form the fixed cushion pan 12. The thigh support system 10 has fixed anchor brackets 18 that extend inwardly from side rails 14. Slider brackets 20 are adapted to move forwardly and rearwardly in relation to the anchor brackets 18. A cushion ramp 22 is supported by the slider brackets 20 so as to permit forward and rearward motion of the cushion ramp 22 when the slider brackets 20 move in relation to the cushion pan 12. The cushion ramp 22 underlies the seat cushion thigh support.

8 Claims, 3 Drawing Sheets

U.S. PATENT DOCUMENTS

| | | | |
|---|---|---|---|
| 4,838,509 A | 6/1989 | Klink et al. | |
| 4,951,963 A * | 8/1990 | Behr et al. | 280/753 |
| 5,366,272 A * | 11/1994 | Lebrun | 297/284.11 |
| 5,370,444 A | 12/1994 | Stulik | |
| 5,460,427 A * | 10/1995 | Serber | 297/216.19 |
| 5,520,438 A | 5/1996 | Stulik | |
| 5,584,525 A * | 12/1996 | Nakano et al. | 296/68.1 |
| 5,588,708 A * | 12/1996 | Rykken et al. | 297/423.2 |
| 5,709,363 A * | 1/1998 | Matsuhashi | 248/421 |
| 5,908,220 A * | 6/1999 | Bauer et al. | 297/284.1 |
| 6,109,693 A * | 8/2000 | Bauer et al. | 297/284.11 |
| 6,450,573 B1 * | 9/2002 | Yamaguchi et al. | 297/216.1 |
| 6,578,915 B2 * | 6/2003 | Jonas et al. | 297/284.11 |
| 6,739,657 B2 * | 5/2004 | Heilig et al. | 297/216.1 |
| 6,773,069 B1 * | 8/2004 | Kaneko et al. | 297/344.17 |
| 6,851,753 B2 * | 2/2005 | Akaike et al. | 297/344.17 |
| 6,908,149 B1 * | 6/2005 | Yamaguchi et al. | 297/216.1 |
| 6,921,133 B2 * | 7/2005 | Taoka et al. | 297/216.16 |
| 7,104,601 B2 * | 9/2006 | Masuda et al. | 297/216.1 |

FOREIGN PATENT DOCUMENTS

| | | |
|---|---|---|
| DE | 101 12 918 A1 | 3/2001 |
| EP | 0 099 414 A3 | 2/1984 |
| EP | 0 353 210 A1 | 1/1990 |
| EP | 1378391 A2 | 1/2004 |
| WO | WO 01/70071 A3 | 9/2001 |

OTHER PUBLICATIONS

German Office Action citing EP1378391A2 and DE907859B.

* cited by examiner

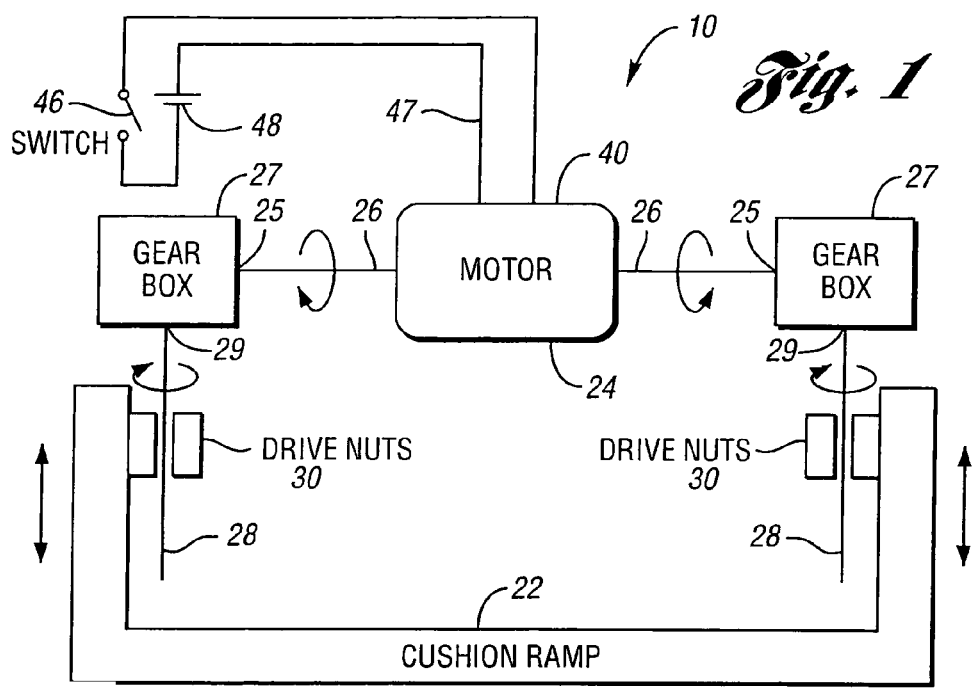
Fig. 1
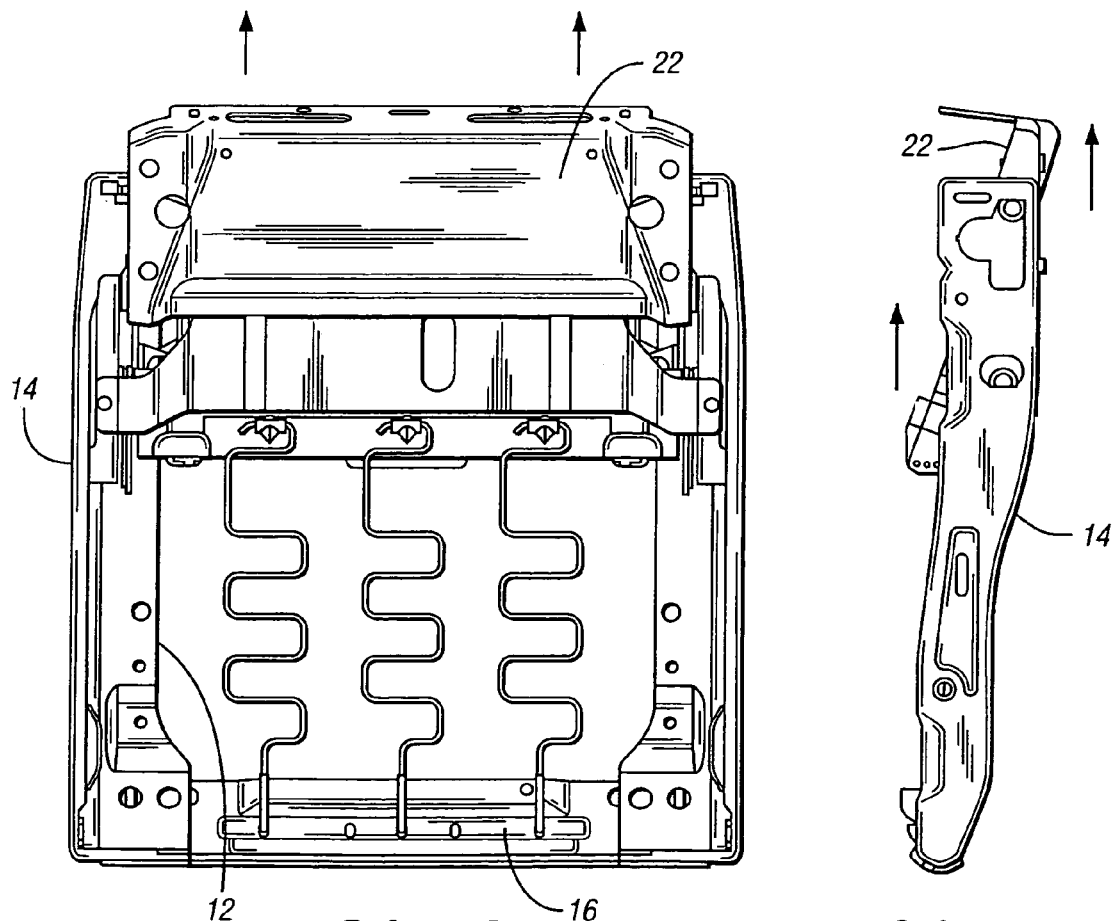
Fig. 2
Fig. 3

ADJUSTABLE SEAT CUSHION THIGH SUPPORT SYSTEM AND METHOD

BACKGROUND OF THE INVENTION

1. Field of the Invention

This invention relates to a thigh support system in combination with a vehicle seat, and a method of providing such a system.

2. Background Art

Seat systems for automobiles and light trucks typically represent approximately 30% to 40% of the total cost of an automotive interior. The quest continues for seat systems that are fully-assembled and ready for installation, yet are designed to achieve maximum passenger comfort and safety by offering a wide range of manual and power features. Examples of such features are lumbar supports, cushion and back bolsters, and leg and thigh supports. Related features include an anti-submarine ramp, which is a mechanism that reduces the risk of a passenger sliding under a seat belt during rapid deceleration.

Illustrative of the prior art is U.S. Pat. No. 4,615,563 which discloses an air bag within a thigh support section in a seat cushion. Other U.S. patents disclose vehicle seats which offer thigh supports that move or tilt predominantly upwardly and downwardly for respective raising and lowering: U.S. Pat. Nos. 4,636,002; 4,712,834, 4,753,479; 4,767,155; 4,775,185; 4,838,509. Some U.S. references disclose an adjustable cushion that is manufactured from foam: U.S. Pat. Nos. 5,370,444; and 5,520,438.

SUMMARY OF THE INVENTION

Against this background, it would be desirable to have a thigh support system including an anti-submarine cushion ramp that can be activated by electrical power or manually.

It would also be desirable to have a thigh support system that uses a pre-existing seat assembly structure without significant incursion into a space lying under the existing seat structure that would otherwise be needed to accommodate such modules as an air blower for a lumbar support system, a seat adjustment mechanism, a heater, or a fan.

Another object is to provide a modular thigh support system that can be packaged within several vehicle environments through utilization of proven and common components. Ideally, such a system would utilize existing flexible seat architecture hardware that can be installed in multiple platforms.

Still another object of the invention is providing a thigh support system that provides added comfort over existing thigh support systems.

Yet another object is to provide fore and aft continuous adjustability over a range of movement.

Further, it would be desirable to provide a thigh support system that moves along an inclined plane. Such movement would provide more of a horizontal than a vertical component to accommodate the preferences of differently sized users Accordingly, it would be desirable to provide a flexible seat architecture system that incorporates many desired comfort features without compromise to safety concerns.

To meet such objects, there is disclosed an adjustable seat cushion thigh support system for use in a seat that has a cushion pan which is fixed in relation to the floor of a vehicle. Conventionally, the pan includes a pair of side rails and a rear cross member extending therebetween. The thigh support system calls for anchor brackets that are affixed to and extend inwardly from the side rails. Slider brackets are attached to an anti-submarine cushion ramp. They are adapted to move in relation to the anchor brackets. Cooperative movement of a slider bracket in relation to the anchor bracket permits forward and rearward motion of the cushion ramp.

Movement can be effected manually in one embodiment, or electromechanically by a motor in another.

BRIEF DESCRIPTION OF THE DRAWINGS

FIG. 1 is a schematic diagram of an adjustable seat cushion thigh support system according to the present invention;

FIG. 2 is a top plan view of the thigh support system;

FIG. 3 is a left side elevation view thereof;

DETAILED DESCRIPTION OF THE PREFERRED EMBODIMENT(S)

Figure 4:
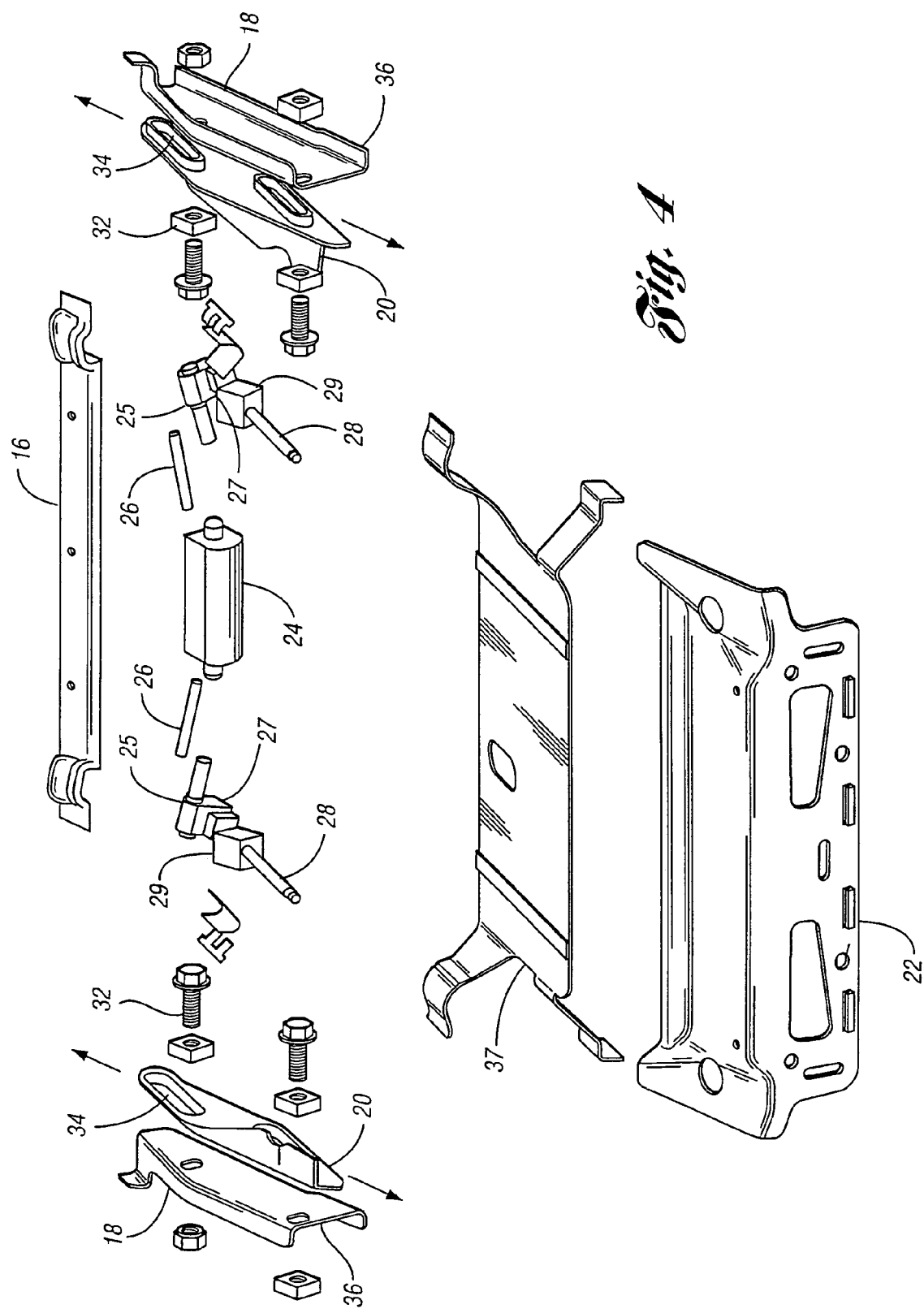
FIG. 4 is an exploded isometric view of an embodiment of the adjustable thigh support system, including an adjustability feature that is powered by an electrical motor.

Turning first to FIG. 1 of the drawings, there is depicted an adjustable seat cushion thigh support system 10 for use in a vehicle seat. In one embodiment, the system includes an electric motor 40 which imparts rotary motion to a pair of lead screws 28 via a linkage mechanism 26 and a pair of gearboxes 27. An electrical circuit 47 includes a switch 46—which is normally open—an electric motor 40, and a source 48 of electrical power. When the circuit 47 is closed by the switch 46 (which is normally, but not necessarily mounted on the side of the vehicle seat), the motor 40 is energized. When energized, the motor 40 imparts a rotary motion to the linkage mechanism 26 that in one embodiment projects from each side of the motor 40. The linkage mechanism 26 lies in communication with a pair of gearboxes 27. The driven side 29 of the boxes 27 redirect the rotary motion of mechanism 26 to a pair of leadscrews 28 that extend from the driven side 29 of each gearbox 27.

The leadscrews 28 rotate about a longitudinal access in response to rotary forces delivered by the gearboxes 27. A threading engagement of the leadscrews 28 is provided by a pair of drive nuts 30 that are fixedly secured to the side rails 14 of the anti-submarine cushion ramp 22. In this way, rotary motion of lead screws 28 is converted into linear motion of the cushion ramp 22.

Additional detail of the adjustable seat cushion thigh support system 10 of the present invention is provided in FIGS. 2–5. In FIGS. 2–3, for example, there is depicted a cushion pan 12 that is secured in relation to a vehicle floor, either fixedly or so as to permit forward or rearward adjustable positioning. The cushion pan 12 has a pair of side rails 14 that are rigidly connected to a rear cross member 16 that extends therebetween.

One or more anchor brackets 18 (FIG. 4) are affixed to and extended inwardly from the side rails 14. One or more slider brackets 20 (FIG. 4) are adapted to move forwardly and rearwardly in relation to the anchor brackets 18.

An anti-submarine cushion ramp 22 (FIGS. 2–4) supports a cushion that underlies a user's thighs. The ramp 22 is supported by the slider brackets 20 (FIG. 4) so as to permit forward and rearward motion of the cushion ramp when the slider bracket 20 moves in relation to the cushion pan 12.

As depicted in FIGS. 1 & 4, the adjustable seat cushion thigh support system includes one or more motors 40 that are supported by a motor support 17 of the cushion pan 12. The linkage mechanism 26 is adapted to deliver rotary motion from the sides of the motor 24. The linkage mechanism 26 includes a pair of gearboxes 27 that redirect rotary motion from a first rotational axis to another rotational axis that lies orthogonally in relation to the first axis. The pair of lead screws is operatively connected to the driven sides 29 of the gearboxes 27. The lead screws are rotatable in response to the motor 40 and the linkage mechanism 26.

A pair of drive nuts 30 is affixed to the slider brackets 20. The drive nut 30 threadingly engage the leadscrews 28 so that as the leadscrews 28 rotate, the slider brackets 20 move linearly in response thereto.

As best depicted in FIG. 4, a pair of bushings 32 extend inwardly from each fixed anchor bracket 18. A pair of oval slots 34 is defined in or through the slider brackets 20. Each pair of slots 34 is adapted to receive associated bushings 32 that engage therewith.

One variation of the disclosed design is to replace the gear boxes 27 by a pair of motors 40. In this way, the linkage mechanism 26 and gear boxes 27 are dispensed with. When electrical energy is delivered to the pair of motors 40 simultaneously, they would rotate in unison, thereby turning the associated lead screws 28. In such an embodiment, there is no requirement for a motor or drive means support 17 that would support a single, centrally located motor. Instead, the pair of motors could be supported by the pair of fixed side rails 14.

A fixed ramp 37 (FIG. 4) is supported by the cushion pan 12 (FIG. 2). The fixed ramp 37 lies below the cushion ramp.

Figure 5:
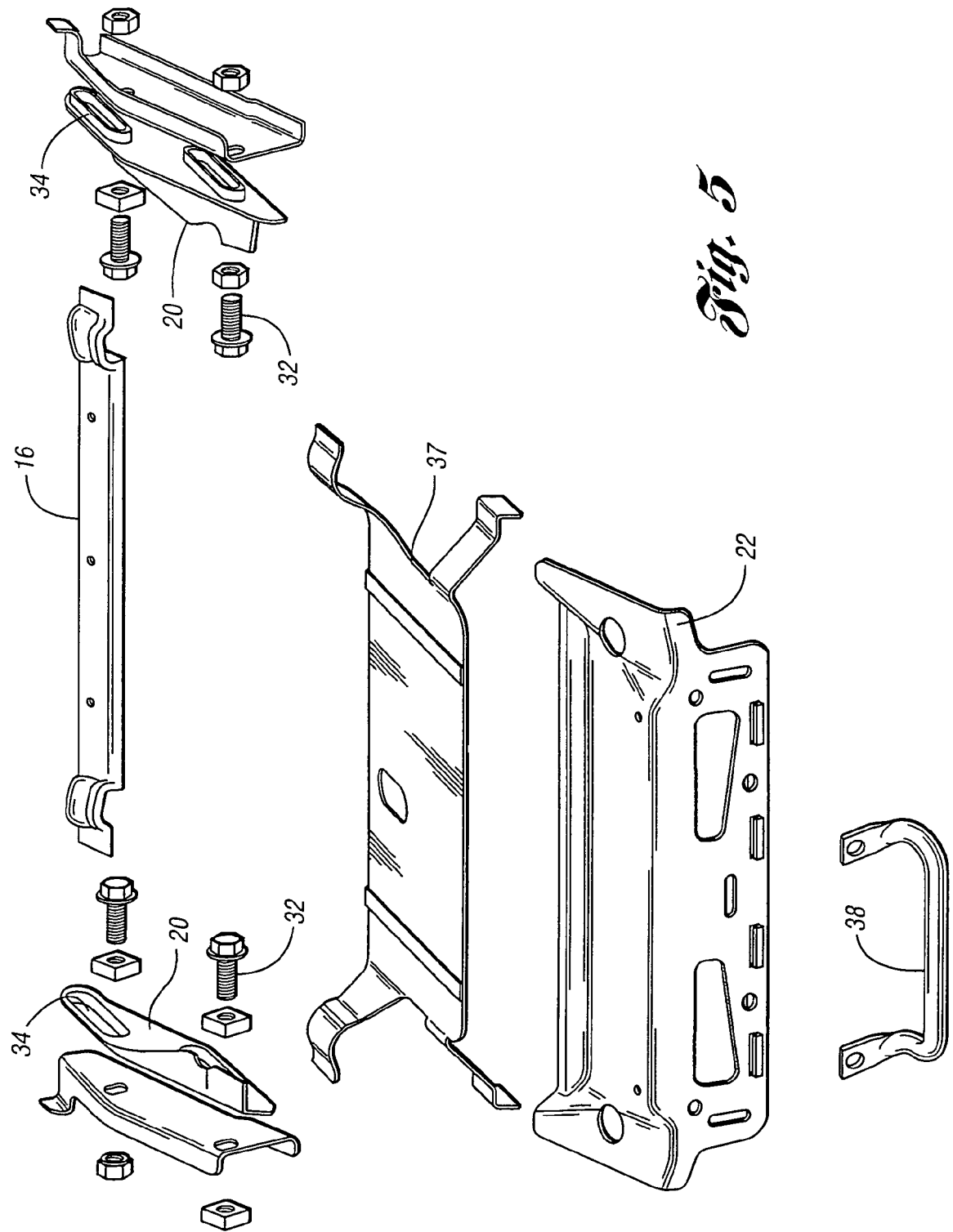
FIG. 5 is an exploded isometric view of an embodiment of the thigh support system that is adjustable manually.

An alternate embodiment of the invention is depicted in FIG. 5. That embodiment lacks a motor, a linkage mechanism, and gearboxes. In the embodiment depicted, linear motion of the cushion (anti-submarine) ramp 22 is effected by a grasp handle 38 to which a manual force can be applied by the user.

As used herein, the term "drive means (40) for moving the cushion ramp" includes a motor 24, a user's hand (not shown), and other means of moving a cushion ramp, such as a rotary handle (not shown) that is turned manually.

The term "drive nuts" 30 includes a singular/unitary nut, and a pair of multi-piece assemblies, wherein each multi-piece assembly had pieces that can be operatively connected together. There is no requirement that the drive nuts be unitary.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustable seat cushion thigh support system for use in a seat having a cushion pan in a vehicle, the cushion pan having a pair of side rails, the thigh support system comprising:
    one or more anchor brackets affixed to and extending inwardly from the side rails;
    one or more slider brackets adapted to move forwardly and rearwardly in relation to the anchor brackets;
    a movable cushion ramp supported by the slider brackets that permit forward and rearward motion of the cushion ramp when the slider brackets move in relation to the cushion pan;
    a pair of bushings extending inwardly from each anchor bracket;
    a pair of oval slots defined by the slider brackets, at least one of the pair of slots being adapted to receive an associated bushing that engages therewith; and
    drive means for moving the cushion ramp forwardly and rearwardly, the drive means including:
        a motor;
        a linkage mechanism adapted to deliver rotary motion from the motor;
        a pair of leadscrews rotatable in response to the motor and the linkage mechanism; and
        a pair of drive nuts affixed to the slider brackets, the drive nuts being threadingly engaged with the leadscrews so that as the leadscrews rotate, the slider brackets move linearly in response thereto.

2. The adjustable seat cushion thigh support system of claim 1, further including:
    a fixed ramp supported by the cushion pan, the fixed ramp lying below the cushion ramp.

3. An adjustable seat cushion thigh support system, including:
    one or more anchor brackets affixed to and extending inwardly from the side rails;
    one or more slider brackets adapted to move forwardly and rearwardly in relation to the anchor brackets;
    a movable cushion ramp supported by the slider brackets that permit forward and rearward motion of the cushion ramp when the slider brackets move in relation to the cushion pan; and
    drive means for moving the cushion ramp forwardly and rearwardly, the drive means including:
        a motor supported between the rails;
        a linkage mechanism extending from the motor;
        a pair of gear boxes, at least one having a driving side that receives the linkage mechanism and a driven side;
        one or more leadscrews extending from the driven sides of the at least one gear box, the one or more leadscrews rotating in response to rotation of the linkage mechanism; and
        one or more drive nuts affixed to the slider brackets, the one or more drive nuts having threaded apertures that are threadingly engaged with the one or more leadscrews so that as the one or more leadscrews rotate, the slider brackets move linearly in response thereto.

4. An adjustable seat cushion thigh support system for use in a seat having a cushion pan in a vehicle, the cushion pan having a pair of side rails, the thigh support system comprising:
    one or more anchor brackets affixed to and extending inwardly from the side rails;
    one or more slider brackets adapted to move forwardly and rearwardly in relation to the anchor brackets;
    movable cushion ramp supported by the slider brackets that permit forward and rearward motion of the cushion ramp when the slider brackets move in relation to the cushion pan;
    drive means for moving the cushion ramp forwardly and rearwardly, the drive means including:
        a motor supported by the cushion pan;
        a linkage mechanism adapted to deliver rotary motion from the motor;
        a pair of leadscrews rotatable in response to the motor and the linkage mechanism; and
        a pair of drive nuts affixed to the slider brackets, the drive nuts being threadingly engaged with the leadscrews so that as the leadscrews rotate, the slider brackets move linearly in response thereto.

5. The adjustable seat cushion thigh support system of claim 4, further comprising:
   a pair of bushings extending inwardly from each anchor bracket; and
   a pair of oval slots defined by the slider brackets, each one of the pair of apertures being adapted to receive an associated bushing that engages therewith.

6. An adjustable seat cushion thigh support system for use in a seat having a cushion pan in a vehicle, the cushion pan having a pair of side rails, the thigh support system comprising:
   one or more anchor brackets affixed to and extending inwardly from the side rails;
   one or more slider brackets adapted to move forwardly and rearwardly in relation to the anchor brackets;
   a movable cushion ramp supported by the slider brackets that permit forward and rearward motion of the cushion ramp when the slider brackets move in relation to the cushion pan;
   drive means for moving the cushion ramp forwardly and rearwardly, the drive means including:
      a motor supported between the rails;
      a linkage mechanism extending from the motor;
      a pair of gear boxes, each having a driving side that receives the linkage mechanism and a driven side;
      a pair of lead screws extending from the driven sides of the gear boxes, the lead screws rotating in response to rotation of the linkage mechanism; and
      a pair of drive nuts affixed to the slider brackets, the drive nuts having threaded apertures that are threadingly engaged with the lead screws so that as the lead screws rotate, the slider brackets move linearly in response thereto.

7. The adjustable seat cushion thigh support system of claim 6 further comprising:
   a fixed ramp extending between the side rails, the fixed ramp lying below the cushion ramp.

8. The adjustable seat cushion thigh support system of claim 6 further comprising:
   a pair of bushings extending inwardly from each anchor bracket; and
   a pair of oval apertures defined by the slider brackets, each pair of apertures associated with a slider bracket being adapted to receive a pair of associated bushings that extend at least partially therethrough.

* * * * *